United States Patent [19]
Firooz

[11] Patent Number: 6,035,035
[45] Date of Patent: Mar. 7, 2000

[54] WRIST MOUNTED TELEPHONE DEVICE

[75] Inventor: Ghassabian Firooz, Marseille, France

[73] Assignee: Classicom, LLC, Great Neck, N.Y.

[21] Appl. No.: 08/867,062

[22] Filed: Jun. 2, 1997

[30] Foreign Application Priority Data

Dec. 19, 1996 [IL] Israel ......................................... 119873
Apr. 4, 1997 [IL] Israel ......................................... 120605

[51] Int. Cl.[7] ................................................. H04M 1/00
[52] U.S. Cl. ............................................................ 379/433
[58] Field of Search ..................................... 379/428, 429, 379/430, 433, 434, 90.01, 110.01; 455/348, 347, 350, 351

[56] References Cited

U.S. PATENT DOCUMENTS

| | | |
|---|---|---|
| D. 358,553 | 5/1995 | Murakami et al. . |
| D. 360,590 | 7/1995 | Murakami et al. . |
| 4,847,818 | 7/1989 | Olsen . |
| 5,008,864 | 4/1991 | Yoshitake . |
| 5,214,623 | 5/1993 | Seager . |
| 5,224,076 | 6/1993 | Thorp . |
| 5,239,521 | 8/1993 | Blonder . |
| 5,274,613 | 12/1993 | Seager . |
| 5,353,017 | 10/1994 | Suzuki et al. ............................ 455/348 |
| 5,381,387 | 1/1995 | Blonder et al. . |
| 5,467,324 | 11/1995 | Houlihan ................................. 379/428 |
| 5,499,292 | 3/1996 | Blonder et al. . |
| 5,659,611 | 8/1997 | Saksa . |

FOREIGN PATENT DOCUMENTS

| | | |
|---|---|---|
| 0602828 | 6/1994 | European Pat. Off. . |
| 0698983 | 2/1996 | European Pat. Off. . |
| 9535622 | 12/1995 | WIPO . |
| 9633569 | 10/1996 | WIPO . |

*Primary Examiner*—Jack Chiang
*Attorney, Agent, or Firm*—Sofer & Haroun, LLP

[57] ABSTRACT

A wrist-mounted telephone device for attaching to the wrist of a wearer and comprising a cellular telephone mechanism and a battery power source which are separately mounted in a common housing.

12 Claims, 5 Drawing Sheets

WRIST MOUNTED TELEPHONE DEVICE

FIELD OF THE INVENTION

The present invention generally relates to portable cellular telephone devices.

BACKGROUND OF THE INVENTION

A cellular telephone is a familiar personal communications accessory which is widely used. Early models were bulky, being carried in motor vehicles or in back packs. Further developed models were stored in the pocket or were clipped onto the belt when not in use. They were, therefore, prone to falling, breaking, or simply being forgotten. A further drawback is related to the time loss created by taking such cellular telephones out of a garment pocket, or belt holder, adjusting the phone's orientation to actuate an answer mode, by opening the mouth piece, or pressing a call receive button, and bringing the unit to the side of the face for use.

A number of wrist telephone devices have been developed typically comprising a telephone device in the form of a wristwatch fastened to the user's wrist via a strap. Thus, the main components of a cellular phone mechanism, such as transceiver, telephone call initiating means, a keyboard, a voice recognition device, a battery, a display, etc. are accommodated within a case, while a microphone and a speaker are usually incorporated within the strap. The strap has a member pivotally coupled thereto in a manner to be rotatable between its inoperative position being aligned with and fastened to the strap; and an operative position being perpendicular to the strap. This pivotal member functions as an ear piece having a receiver at its free end and a microphone mounted on or close to its opposite end proximate the strap. The main disadvantages of such telephone devices are self-evident, consisting in numerous manipulations that need to be done for operating the device at least when either receiving or making a call, such as unfastening the pivotal member from the strap, rotating the same into its operative position and, possibly, adjusting a length of the pivotal member. Moreover, all these manipulations are to be executed by that user's hand which is free of the wristwatch. This is uncomfortable in general, and particularly so when such device is worn by a vehicle driver as is increasingly common. Additionally, the battery is a part of that case containing the whole phone mechanism and is, therefore, too small to meet the requirements of the user.

One of the common drawbacks of all known cellular phone devices is the disturbance caused thereby when it starts to ring, for example, when the user is at public gathering, concert, lecture, or the like. It is often the case that the user wishes his cellular phone to be permanently switched on so as to be immediately informed of an incoming call. However, it would clearly be desirable for the phone device to be actuated in a manner to inform the user of an incoming call without disturbing others in his close vicinity. In order to solve this problem, usually a vibrator is included in the cellular phone mechanism being connected to a phone ringer in such a manner as to cause a continuous vibration of the whole cellular phone device when actuated by an incoming call.

SUMMARY OF THE INVENTION

It is thus a major object of the invention to eliminate or at least reduce the above listed and other problems of conventional cellular phones and provide a wrist-mounted cellular telephone device shaped like a bracelet, wherein all main components of a cellular phone mechanism are accommodated within the bracelet so as to be distributed thereinside around the user's wrist more effectively and having a battery which is separated from that portion of the bracelet which carries the cellular phone mechanism. This enables to design the battery of significantly larger dimensions and easily replaceable without disturbing the cellular phone mechanism itself.

It is a further object of the present invention that the bracelet-shaped cellular phone device be constructed so as to be easily and quickly put into operation.

There is thus provided according to the present invention a wrist-mounted cellular telephone device comprising a cellular telephone mechanism and a battery power source separately mounted in a common housing.

Preferably, the housing is a bracelet having at least first and second interlocking portions, wherein the cellular telephone mechanism is accommodated within the first portion, and the battery power source is accommodated in the second portion of the bracelet.

The cellular telephone device includes an ear piece which is preferably is extendable to a region of a palm of a wearer and retractable to a region of the housing. According to one embodiment of the invention, the ear piece is extended by a flip open cover pivotally coupled to the housing. Alternatively, the ear piece is further extended by at least one accordion like segment of the cover, The cover preferably includes at least one telescopic member to which the ear piece is attached.

According to another embodiment of the invention, the ear piece of the cellular telephone mechanism is mounted at an end of a tube having a securing means for securing to a wearer's finger. A resilient biasing means may be provided and coupled to the end of the tube for retracting the tube into the housing upon release of the securing means.

Preferably, the battery is removably accommodated within the second portion of the bracelet. Each of the first and the second portions of the bracelet arc generally C-shaped. The battery may be constituted by the second C-shaped portion of the bracelet. The first and second portions of the bracelet may be coupled to each other by hinges The bracelet may be interlocked by a clasp mechanism.

The cellular telephone mechanism preferably includes a telescoping antenna. The device may also comprise an indication means responsively coupled to the cellular telephone mechanism for alerting the wearer of an incoming call. The indication means may include a vibrator, The vibrator preferably comprises a mechanical assembly including a reciprocating prong for prodding the wearer's wrist.

Preferably, the device also comprises a data display panel, and/or a watch unit mounted to the housing.

BRIEF DESCRIPTION OF THE DRAWINGS

In order to understand the invention and to see how the same may be carried out in practice, several preferred embodiments will now be described, by way of example only, with reference to the accompanying drawings, in which.

DETAILED DESCRIPTION OF THE PREFERRED EMBODIMENTS

Figure 1:
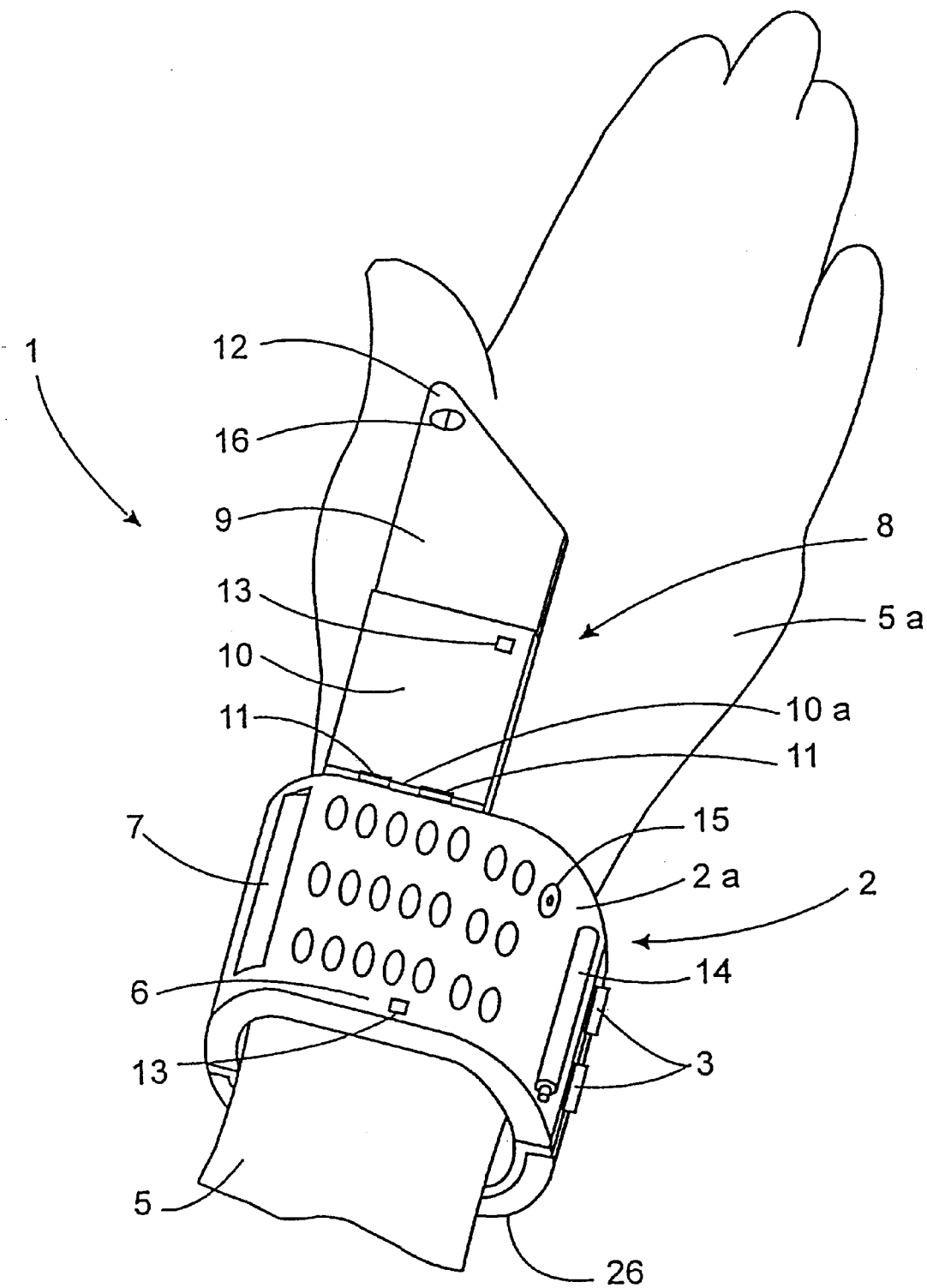
FIG. 1 is pictorial illustration of a wrist-mounted cellular phone device according to one embodiment of the invention.
Figure 2:
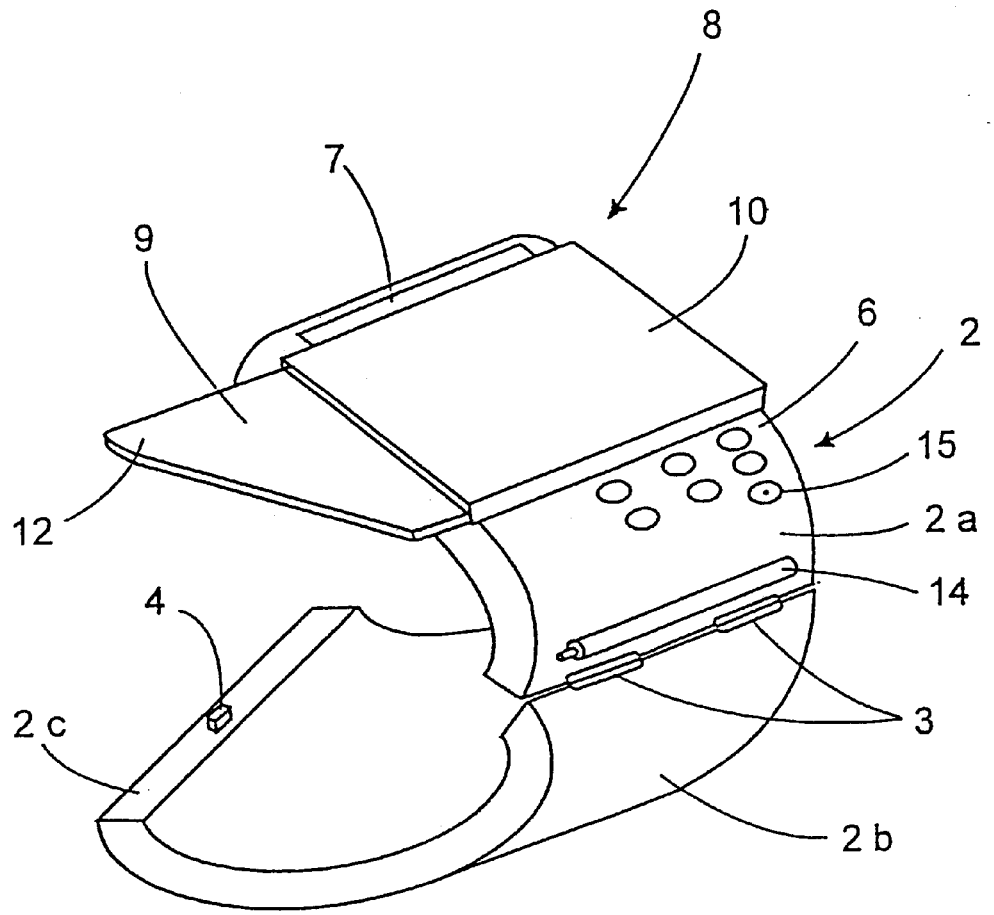
FIG. 2 is a pictorial view of the device of FIG. 1 more specifically illustrating an unlocked position thereof.

Referring to FIGS. 1 and 2 there is shown a device generally designated 1 which comprises a housing in the form of a bracelet 2 having two C-shaped portions 2a and 2b. The portions 2a and 2b are at one end permanently coupled by a pair of hinges 3, so as to be pivotal one relative to the other between a closed state of the bracelet 2 when being worn on a wrist 5 of the user, and an open state for removing the bracelet from the user's wrist. The portions 2a and 2b at an opposite end are interlocked by a clasp mechanism of known type, for example having a latch 4 made on an inside butt end 2c to engage a respective recess made in an interfacing butt end (not shown) of the portion 2a. It is appreciated that appropriate means are provided for easily unlocking the latch 4 by the user's hand. Obviously, any other clasp mechanism may be employed for the same purpose of providing such an engagement between the portions 2a and 2b that, on the one hand, is insured against accidental unlocking, and, on the other hand, is adapted to be easily unlocked by the user. For example, a magnetic clasp mechanism may be used. As shown in FIG. 1, the bracelet 2 wraps around the user's wrist 5 in such a manner that all main components of a conventional cellular phone mechanism, except for the battery, are disposed on a palm side 5a of the wrist 5. Thus, the portion 2a is provided at outside thereof with a conventional keypad 6 easily available for the user, and a liquid crystal display 7. The display 7 is typically capable of displaying a number currently dialed by the user when transmitting an outgoing call from the device 1 and also a number of a remnote telephone device generating an incoming call, if such option is authorized by an owner of the remote telephone.

Coupled to the portion 2a of the bracelet 2 is a flip open telescopic cover, generally at 8, formed of two hinged plates 9 and 10. The plate 10 is recessed and slightly larger than the plate 9 so as to receive the latter thereinside in a conventional manner. To this end, the plate 10 may be provided internally with a pair of spaced parallel guides, extending along opposite sides of the plate 10 for supporting the plate 9. Such telescopic arrangement is well known and, therefore, is not specifically illustrated. Hence, the plate 9 is adapted for sliding movement between a folded position thereof when being partly inserted into the plate 10 (FIG. 2) and an extracted position completely projecting from the plate 10 (FIG. 1). An end 12 of the plate 9 is angled and, when in the folded position of the plate 9, protrudes from the plate 10, as better shown in FIG. 2. The plate 10 is hingedly connected at one end to the portion 2a of the bracelet by a pair of hinges 11, so as to be rotatable through approximately 180° relative to the portion 2a between its open, extracted position shown in FIG. 1 and its closed, retracted position shown in FIG. 2 partly covering the keypad 6. A two-segment magnetic clasp, generally at 13, is suitably accommodated on the portion 2a and the plate 10, to keep the cover 8 closed.

Further provided is a conventional antenna 14 which may be a telescopic antenna, mounted on the portion 2a opposite to the display 7. The antenna 14 may be supported on either end of either portion of the bracelet 2 in a manner to extend across the supported portion, so that an axis of the antenna 14 is parallel to the user's arm. Also provided are a conventional microphone 15 (constituting a mouth piece) mounted on the portion 2a and a speaker unit 16 (constituting an ear piece) located on the angled end 12 of the plate 9.

Figure 3A:
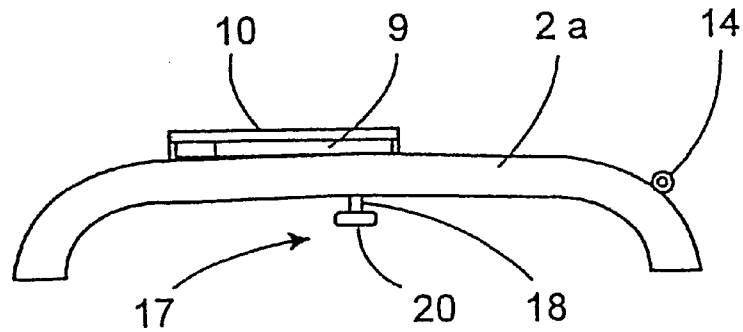
FIG. 3a is a side view of the portion of the device of FIG. 2, more specifically illustrating a mini-vibrator.

As illustrated in FIG. 3a, the device 1 also includes a mini-vibrator 17 having a reciprocating prong 18 projecting from the portion 2a and responsive to a ring signal for prodding the user's wrist so as to inform him of an incoming call without disturbing others in the vicinity. A miniature, rubber, disk-shaped washer 20 is attached to a projecting end of the prong 18, which is connected at its opposite end to a conventional cellular phone ringer (not shown) in such a manner that the latter, when actuated by an incoming call, actuates the mini-vibrator 17 causing reciprocation of the prong 18. In public places where the regular audible ring would disturb, it may de-actuated, whilst still allowing the user to be informed, via the mini-vibrator 17, of an incoming call.

Figure 3B:
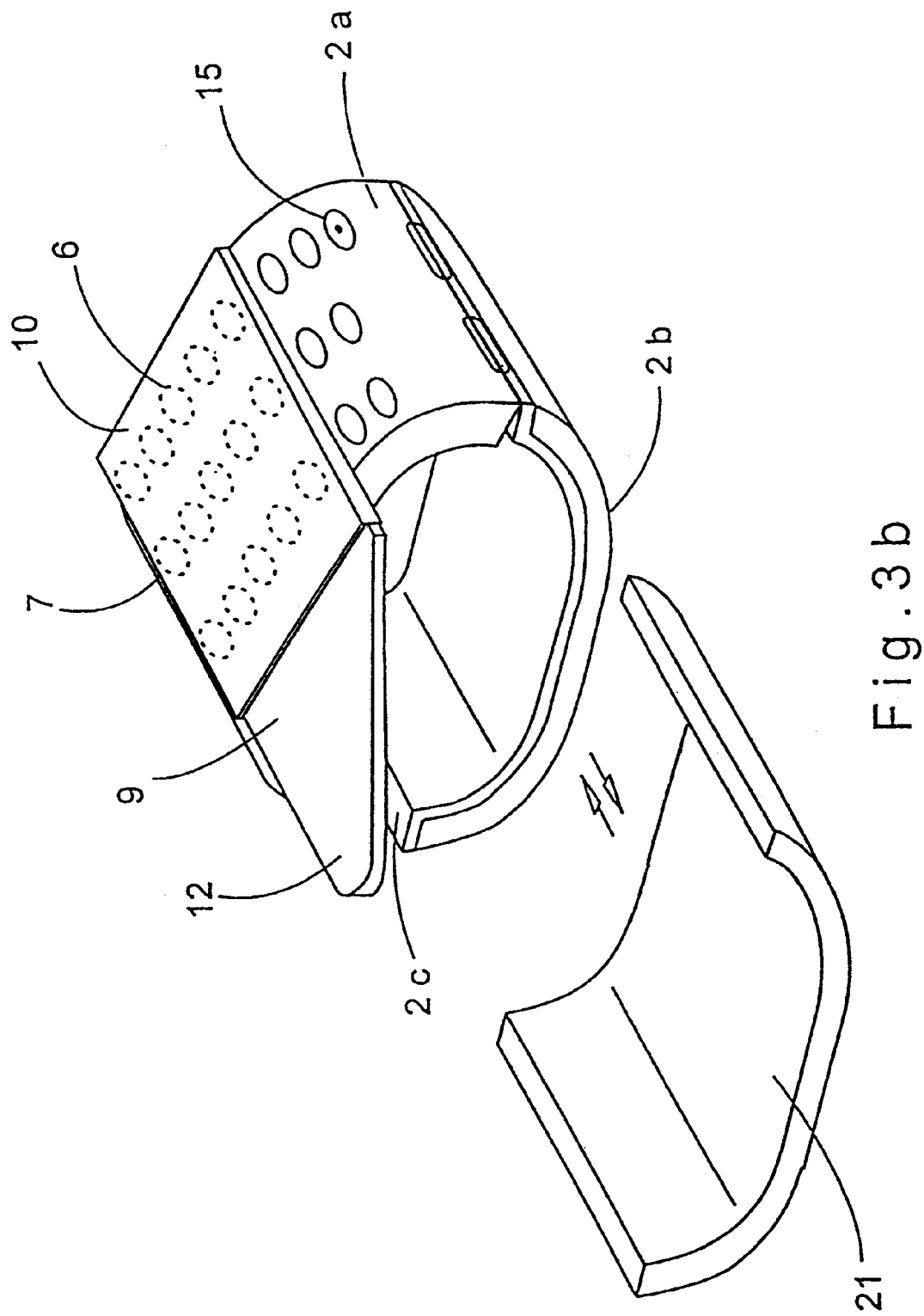
FIG. 3b is a partly exploded view of the device of FIG. 1 with a retracted flip open cover.

Referring now to FIG. 3b, a battery 21 is illustrated being shaped like a part of the bracelet 2 and being dimensioned so as to be fit into and removed out of the portion 2b which is generally hollow and functions as a battery holder member. To this end, the hollow portion 2b is provided internally with a pair of peripheral slots, or guides, so as to allow the battery to be slid in and out in a conventional manner. If desired, the portion 2b may be of two part construction, both parts being generally curved-shaped sections designed to accommodate a flat battery therebetween. Alternatively, although not specifically shown, the battery 21 itself may be provided with a clasp mechanism of a known type and, when attached, for example in the manner described above with respect to the portions 2a and 2b, completes the overall bracelet shape, thus functioning as an integral portion 2b of the bracelet. Obviously, instead of single battery power source as described above, two or more batteries having appropriate electric circuit connectors may be employed. For this purpose, the portion 2b may be formed of two or more segments connected by hinges each either carrying a battery thereinside or itself being a battery.

The device 1 being a cellular phone device is designed to include such features of conventional cellular phones as time, date, alarm clock, automatic dialing mode, a phone book. Additionally, a sensor means is provided for automatically putting the device into an operative mode when the plate 10 of the cover is rotated into its open position and vice versa. All these functions are well known per se and, therefore, are not specifically described.

The user wears the cellular phone device 1 on his wrist 5, and when using the device, holds his hand to the side of his face in a natural hand position with the bracelet 2 near a region of his mouth. The microphone 15 in the bracelet portion 2a is thereby proximate the user's mouth, whilst the tips of his fingers are close to his ear. The speaker 16 in the extended plate 9 of the cover may now be held near to the user's ear. Cupping of the fingers serves to filter out background noise, and simultaneously provide a resonant external cavity for improving the audio quality of the sound emanating from the speaker.

Figure 4A:
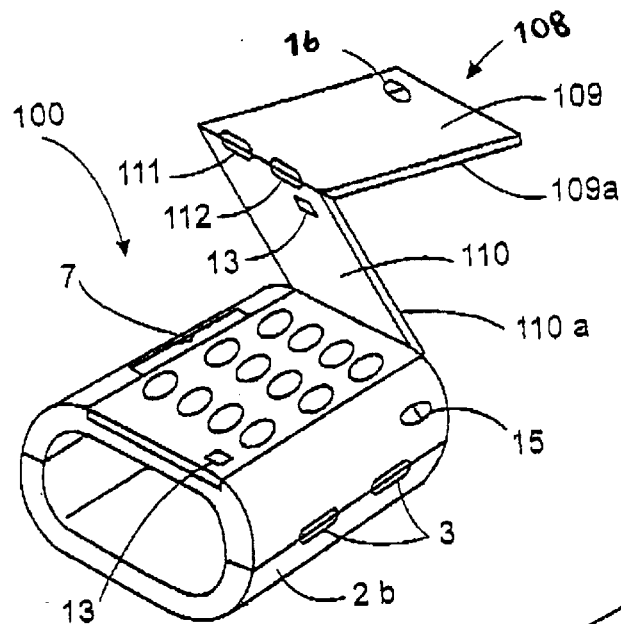
FIGS. 4a to 4c illustrate three more embodiments of the invention.
Figure 4B:
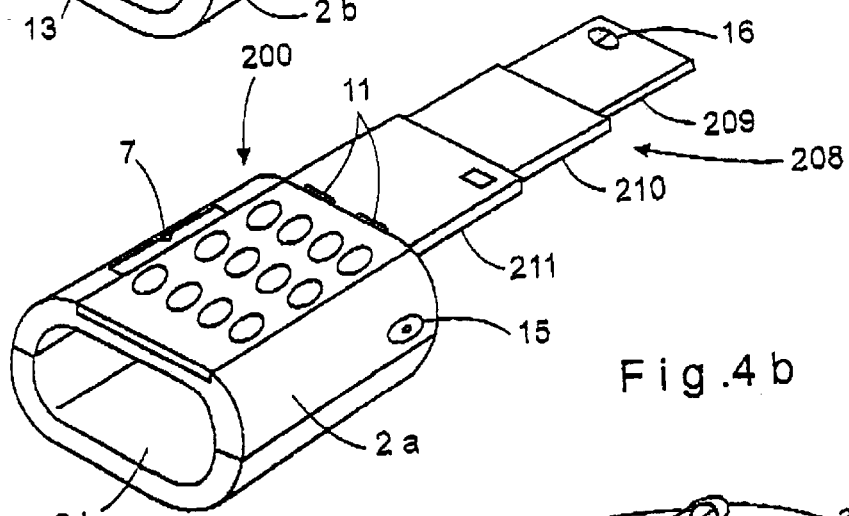
Figure 4C:
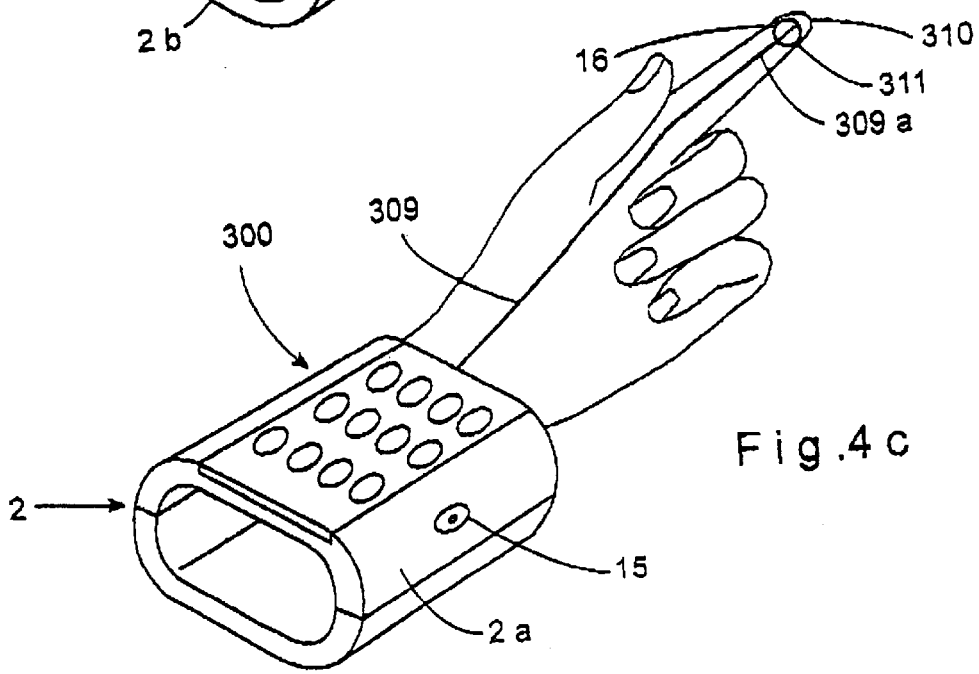

Reference is now made to FIGS. 4a, 4b and 4c illustrating three more embodiments of the present invention, which are in general similar to the above described embodiment and, therefore, those components which are identical in all embodiments are identified by the same reference numerals. Cellular phone devices 100 and 200 are distinguished from each other and from the device 1 by somewhat different constructions of a flip open cover. Thus, as clearly shown in FIG. 4a, a cover 108 is formed of two plates 109 and 110 pivotally coupled by a pair of hinges 111 and 112, wherein the speaker is mounted on the plate 109. It will be readily understood that the cover 108 is foldable and extendable like an accordion. An additional two-part magnetic clasp is provided in a conventional manner on an inner surface 109a of the plate 109 interfacing an inner side 110a of the plate 110, which is not specifically shown. Obviously such magnetic clasp may be replaced by any other means suitable for the same purpose. A cover 209 of the cellular phone device 200 is a three-plate telescopic cover, wherein a last plate 209 is slidingly insertable into a center plate 210 which, in turn, is receivable by a plate 211 in a manner described above with reference to FIGS. 1–3.

Turning now to FIG. 4c, the cellular phone device 300 has no cover at all and is characterized by a flexible thin tube 309 containing connections to the speaker 16 mounted on its free end 309a. The other ends of the electrical connections are connected to an audio output of the cellular phone. As shown, the free end 309a of the wire 309 is attached to a forefinger 310 of the user by means of a loop 311 (constituting a securing means). Thus, the user's hands are substantially free for operating the phone device 300. A coil spring (not shown) is fixed at one end to the portion 2a and is fixed at an opposite end to the free end 309a of the tube 309. When the tube 309 is drawn into the extended operated position as shown in FIG. 4c, the coil spring is resiliently biased so as to allow for automatic retraction by the coil spring of the tube 309 when required.

It should be noted that both of the C-shaped portions of the bracelet 2 in any of the preferred embodiments described above are preferably formed with rough inner surfaces overlying the user's wrist 5 for preventing undesirable movement of the bracelet 2.

Figure 5A:
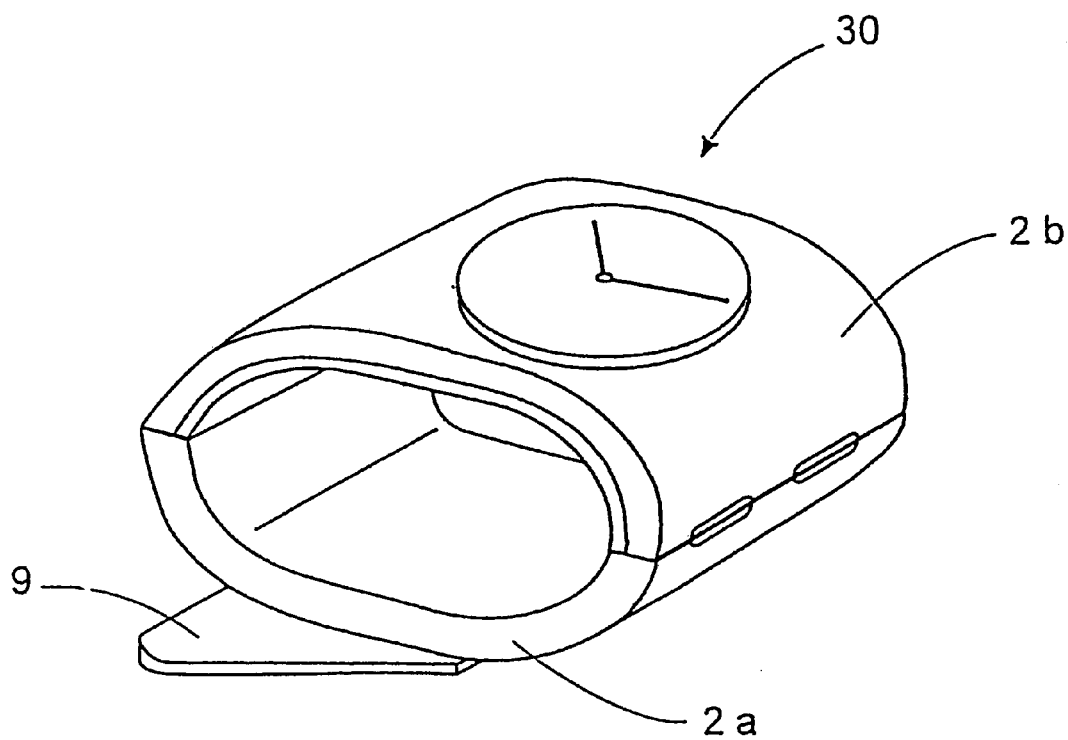
FIG. 5a illustrates still another embodiment of a wrist-mounted cellular phone device having a wrist-watch mounted thereon.
Figure 5B:
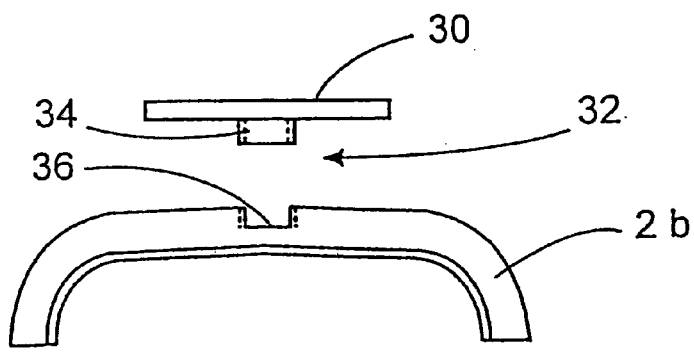
FIG. 5b is a cross-section of the device of FIG. 5a, more specifically illustrating a coupling means for mounting the wrist-watch on to the cellular phone device.

Referring to FIGS. 5a and 5b, there is illustrated a cellular phone device which is similar to any of the preferred embodiments of the invention, for example the device 1, and additionally comprises a watch unit 30 mounted on the portion 2b. To this end, a conventional bolt-and-nut assembly 32 is provided. Thus, a screw-threaded bolt 34 projects from a bottom side of the watch unit 30 so as to be received by a nut 36 made in the portion 2b. Obviously, any other means may be used for the same purpose. For example, the watch 30 may be mounted on, or integrally formed with, its housing which, in turn, may be coupled to the bracelet 2 by hinges or the like. It should be noted that the construction may be such that the same battery 21 of the cellular phone device 1 supplies power to the watch 30.

It will be readily appreciated by those skilled in the art that many modifications may be applied to the invention as exemplified without departing from its scope as defined in and by the appended claims. Thus, for example, antenna may be an integral part of either a telescoping or accordion-shaped cover containing the ear piece, or an integral part of the tube attaching the ear piece to the bracelet.

What is claimed is:

1. A wrist-mounted telephone device for attaching to a wearer's wrist, the device comprising a phone mechanism and a battery power source, wherein the battery power source circumferentially extends along at least a substantial portion of the wearer's wrist, further comprising a watch unit, wherein said watch unit and phone mechanism are disposed in a diametrically opposite relationship on the wearer's wrist.

2. A wrist-mounted telephone device for attaching to a wearer's wrist, the device comprising a phone mechanism and a battery power source which at least together form a rigid bracelet, and also comprising a watch unit, wherein said watch unit and phone mechanism are disposed in a diametrically opposite relationship on the wearer's wrist.

3. A wrist-mounted device having a phone mechanism and a battery power source, the device comprising a watch unit disposed diametrically opposite to a keypad of said phone mechanism on the wearer's wrist.

4. The device according to claim 3, wherein said battery power source circumferentially extends along at least substantial portion of the wearer's wrist.

5. The device according to claim 3, wherein said phone mechanism and said battery power source are distributed around the wearer's wrist in a manner to form together a bracelet, said watch unit being attached to said bracelet.

6. The device according to claim 3, wherein said phone mechanism, said battery power source and said watch unit are distributed around the wearer's wrist in a manner to form together a bracelet.

7. The device according to claim 3, wherein said phone mechanism is located at a palm side of the wearer's wrist.

8. The device according to claim 3, further comprising an indication means responsively coupled to the phone mechanism for alerting the wearer of an incoming call.

9. The device according to claim 8, wherein the indication means includes a mechanical assembly including a reciprocating prong for prodding the wearer's wrist.

10. The device according to claim 5, which device is strapless.

11. The device according to claim 6, which device is strapless.

12. A strapless wrist-mounted telephone device comprising a phone mechanism and a battery power source which are distributed around a wearer's wrist within a bracelet-shaped housing, also comprising a watch unit, wherein said watch unit is disposed diametrically opposite to the phone mechanism.

* * * * *